(12) United States Patent
Schnelz et al.

(10) Patent No.: US 6,189,830 B1
(45) Date of Patent: Feb. 20, 2001

(54) TUNED ENGINE MOUNTING SYSTEM FOR JET AIRCRAFT

(75) Inventors: James R. Schnelz, Seattle; Donald T. Powell, Auburn, both of WA (US)

(73) Assignee: The Boeing Company, Seattle, WA (US)

( * ) Notice: Under 35 U.S.C. 154(b), the term of this patent shall be extended for 0 days.

(21) Appl. No.: 09/259,092

(22) Filed: Feb. 26, 1999

(51) Int. Cl.[7] .................................................. B64D 27/18
(52) U.S. Cl. ............................................ 244/54; 248/554
(58) Field of Search .............................. 244/54; 60/39.31; 248/554, 557

(56) References Cited

U.S. PATENT DOCUMENTS

| | | | |
|---|---|---|---|
| 2,891,743 | * 6/1959 | Bligard et al. ........................ | 248/557 |
| 4,917,331 | 4/1990 | Hager et al. ........................... | 244/54 |
| 5,054,715 | 10/1991 | Hager et al. ........................... | 244/54 |
| 5,065,959 | 11/1991 | Bhatia et al. . | |
| 5,181,675 | * 1/1993 | Lardellier et al. ..................... | 244/54 |
| 5,238,206 | * 8/1993 | Pachomoff ............................ | 244/54 |
| 5,687,948 | 11/1997 | Whiteford et al. ............... | 248/557 X |
| 5,871,177 | * 2/1999 | Demouzon et al. .................. | 244/54 |

* cited by examiner

Primary Examiner—Robert P. Swiatek
(74) Attorney, Agent, or Firm—Brooks & Kushman P.C.

(57) ABSTRACT

An aircraft assembly includes a wing, a pylon structure attached to the wing, an aft engine mount attached to the pylon structure, and an engine attached to the aft engine mount. The aft engine mount includes a pivotal attachment to the pylon structure and first and second spring beams operatively connected to the pylon structure at opposing sides of the pivotal attachment for damping pivotal movement of the engine with respect to the pylon structure to enable tuning of the natural frequency of the engine to avoid wing flutter.

20 Claims, 5 Drawing Sheets

TUNED ENGINE MOUNTING SYSTEM FOR JET AIRCRAFT

BACKGROUND OF THE INVENTION

1. Field Of The Invention

The present invention relates to a tuned engine mounting system for a jet aircraft, and more particularly to an engine mounting system in which an aft engine mount is provided with spring beams for damping pivotal movement of the engine.

2. Background Information

It is a design goal that when an aircraft wing is subjected to a momentary force in flight which causes the wing to oscillate between a bent state and an unbent state, that in the absence of this force, the oscillations will damp out and the wing will return to a steady, unbended state. On the other hand, "wing flutter" refers to a phenomenon in which the wing oscillations between the bent state and the unbent state do not damp out. Rather, the amplitude of these oscillations either remains constant or increases over time.

Wing flutter is an aeroelastic instability produced by the coalescing and proper phasing of two or more structural vibration modes of an aircraft in flight. A flutter mode usually involves both bending and torsion-types of motion in which the torsional motion extracts energy from the airstream and drives the bending mode to increasingly higher amplitudes. In other cases, these oscillations are lightly damped, but stable, within the operating speed envelope of the aircraft and can cause a reduction in riding comfort of the aircraft.

The location of the engine nacelle relative to the wing, the mass properties of the engine, and the stiffness of the strut which attaches the nacelle to the wing are factors which influence the flutter characteristics of the wing. More specifically, the natural frequency of the nacelle and the manner of strut installation can influence the mode and air speed at which the wing oscillations become unstable (flutter).

Conventionally, in order to avoid wing flutter, the natural frequency of the nacelles and nacelle struts are restricted within a narrow range. For example, in earlier models of the Boeing 747 aircraft, the outboard engine nacelles are permitted to oscillate at a natural frequency of about 2 cycles per second in a lateral direction. If the outboard engine nacelle lateral frequencies are significantly above or below 2 cycles per second, then wing flutter can result at an unacceptably low air speed.

However, in some newer aircraft which feature stronger but less stiff lifting surfaces, flutter can occur at air speeds below that required by government regulations. In this case, the avoidance of wing flutter requires the unsatisfactory solution of reducing the maximum operating speeds of the aircraft.

U.S. Pat. No. 4,917,331 discloses a method for preventing wing flutter in an aircraft, wherein the lateral natural frequencies of the left and right engines are sufficiently different so that when subjected to a time varying disturbance in flight, the flutter speed of the aircraft is increased. In this design, spring beams are attached at the interface between the pylon structure and the wing for damping movement of the engine. The spring beams may be tuned to provide the desired lateral frequency.

FIG. 1 shows a prior art engine and wing structure, wherein a wing 10 supports a pylon structure 12, which supports the engine 14. The pylon structure 12 is attached to the wing 10 at the upper link interface 16 and mid-spar fittings 18. The spring beam structure described in U.S. Pat. No. 4,917,331, referenced above, would be attached at the interface between the wing 10 and the pylon structure 12, such as in the areas of the upper link interface 16 or mid-spar fittings 18 shown in FIG. 1. The spring beam attachment structure would replace such attachment devices 16,18. Because the spring beams are spaced substantially from the center line 20 of the engine (the center of mass), the placement of such spring beams is limited, and the size of the entire spring beam attachment structure is significant as a result of strength requirements. Accordingly, the spring beam attachment structure generally defines the placement of the engine 14. In other words, as a result of the strength limitations of the attachment, the engine 14 may not be positioned where desired to optimize efficiency.

SUMMARY OF THE INVENTION

The present invention provides a significant improvement over the prior art described above by providing a spring beam attachment located at the aft engine mount, such as aft engine mount location 22 shown in FIG. 1. The aft engine mount 22 shown in FIG. 1 is replaced by a spring beam structure on opposing sides of a pivotal connection. Because the aft engine mount location 22 is substantially closer to the center line 20 of the engine 14 in comparison with the attachments 16,18, the moment arm length is reduced by approximately 3 feet and the size of the spring beam attachment structure may be substantially reduced. This smaller structure is therefore not limiting upon the placement of the engine 14, thereby allowing optimization of engine placement for improved efficiency. Also, the placement of the spring beams at the attachment between the pylon structure 22 and the engine 14, as opposed to the attachment between the pylon structure 12 and the wing 10, provides the same advantage of enabling lateral frequency tuning to minimize flutter.

More specifically, the present invention provides an aircraft assembly including a wing, a pylon structure attached to the wing, an aft engine mount attached to the pylon structure, and an engine attached to the aft engine mount. The aft engine mount includes a pivotal attachment to the pylon structure and first and second spring beams operatively connected to the pylon structure at opposing sides of the pivotal attachment for damping pivotal movement of the engine with respect to the pylon structure to enable tuning of lateral frequency of the engine.

Objects, features and advantages of the invention are readily apparent from the following detailed description of the best mode for carrying out the invention.

DETAILED DESCRIPTION OF THE INVENTION

The present invention provides an engine mounting hanger system which has a tunable dual spring beam arrangement that can be altered slightly to change the mount stiffness and dramatically change the overall lateral natural frequency of the below-wing propulsion package. Essentially, the dual spring beam pylon/wing attachment has been relocated from the pylon/wing interface to the aft engine mount where the desirable lateral damping feature is preserved while allowing the ultimate strength of the pylon/wing interface to be increased and uncompromised. This invention allows the airplane to meet flutter avoidance criteria with maximum cruise speed, fuel load and range, and minimum structural weight in the wing. With the stiffness tuning element moved to the aft engine mount where the loading is much lighter, the spring elements required are much smaller and lighter, and the pylon-towing attachment may be a conventional design. Additionally, the dynamic pylon-towing loading is significantly reduced, thereby allowing further growth in engine size and improvements in airplane performance.

Figure 1:
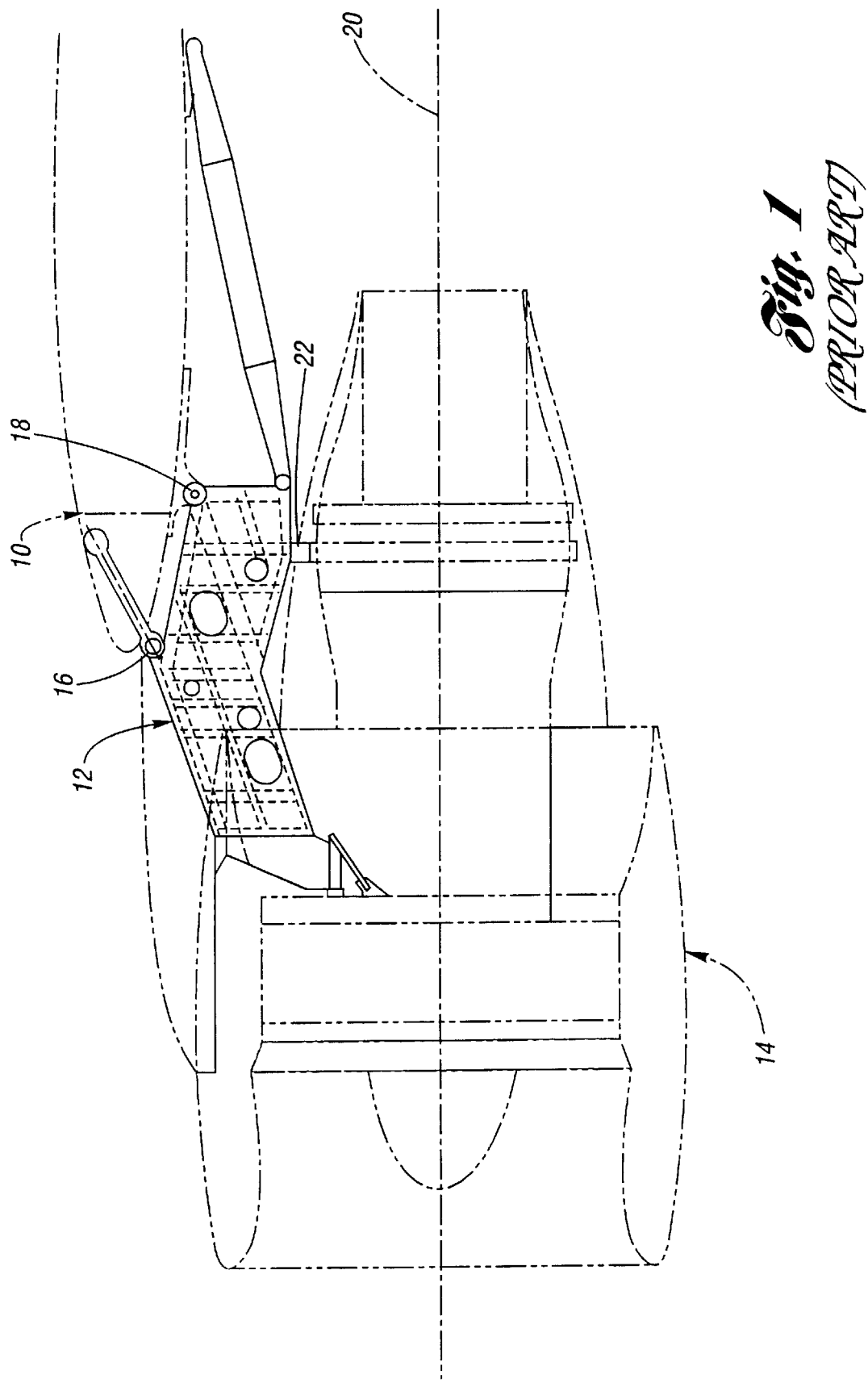
FIG. 1 shows an elevational cross-sectional view of a prior art wing-to-engine attachment.
Figure 2:
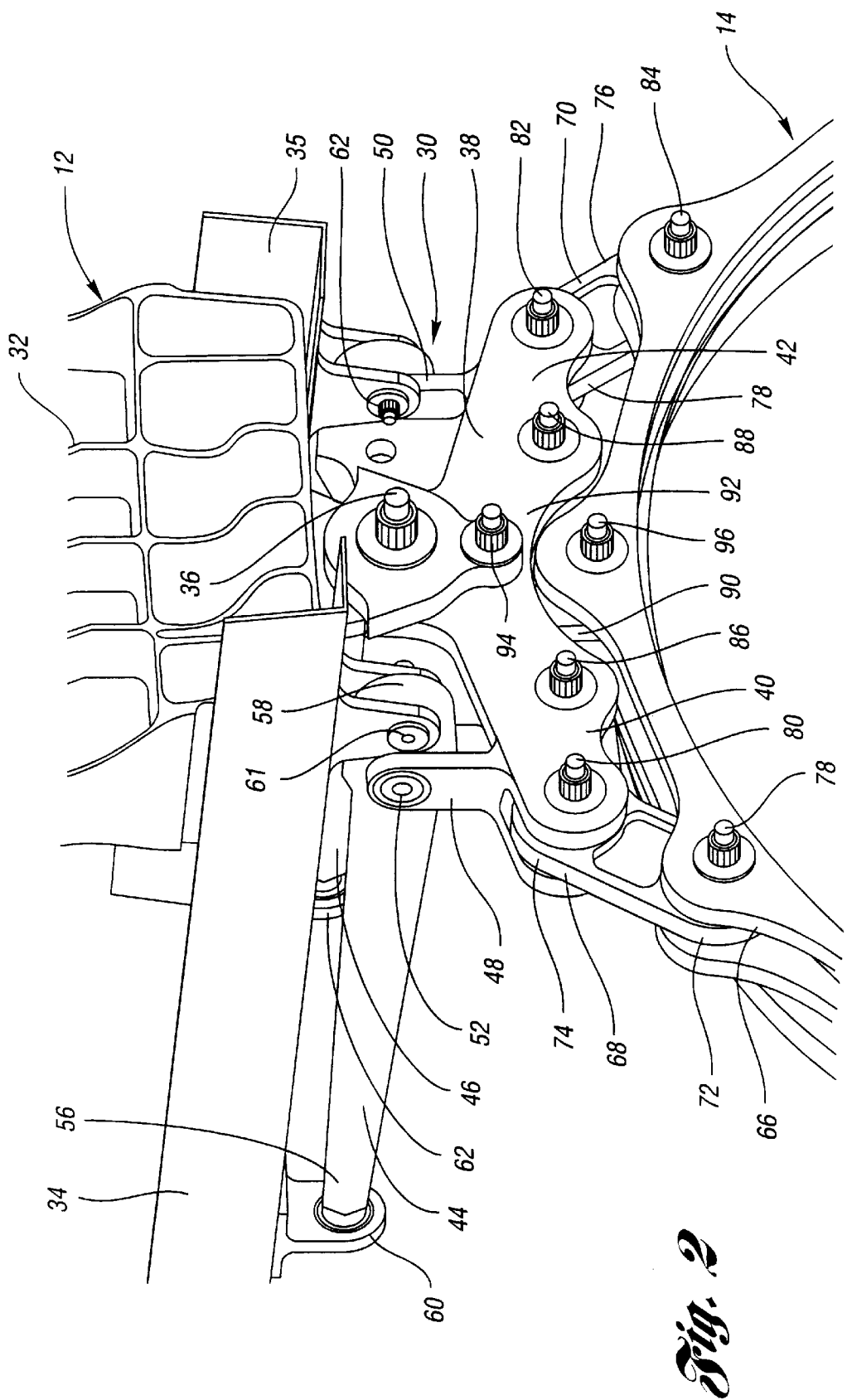
FIG. 2 shows a partial perspective view of an aft engine mount attaching a pylon structure to an engine in accordance with the present invention.

As shown in FIG. 2, the improved aft engine mount 30 attaches the engine 14 to the pylon structure 12. The pylon structure 12 includes a pylon bulkhead 32, and pylon lower spar chords 34,35. A hanger center pivot 36 pivotally attaches a hanger-shaped fitting 38 to the pylon structure 12. Accordingly, the hanger-shaped fitting 38 is pivotable about the hanger center pivot 36. The opposing ends 40,42 of the hanger-shaped fitting 38 are connected to the spring beams 44,46 by the flanges 48,50 and the pivot pins 52,54.

Each of the spring beams 44,46 is connected at first and second ends 56,58 thereof to the respective pylon lower spar chord 34,35. The first end 56 of each spring beam 44,46 is movably attached within the journal 60,62 to allow fore and aft movement as the spring beam 44,46 flexes. The second end 58 of each spring beam 44,46 is pivotally connected to the respective pylon lower spar chord 34,36 by the forward beam pins 61,62.

Accordingly, as the engine 14 pivots laterally on the hanger-shaped fitting 38 about the center pivot 36, the spring beams 44,46 will flex between the first and second ends 56,58 thereof as a result of forces applied through the pivot pins 52,54. As bending of the spring beams 44,46 occurs, the first end 56 of the respective spring beams 44,46 will travel forward within the respective journal 60,62, and the second end 58 of each spring beam 44,46 will pivot about the respective forward beam pin 61,62, thereby allowing flexing therebetween.

Figure 3:
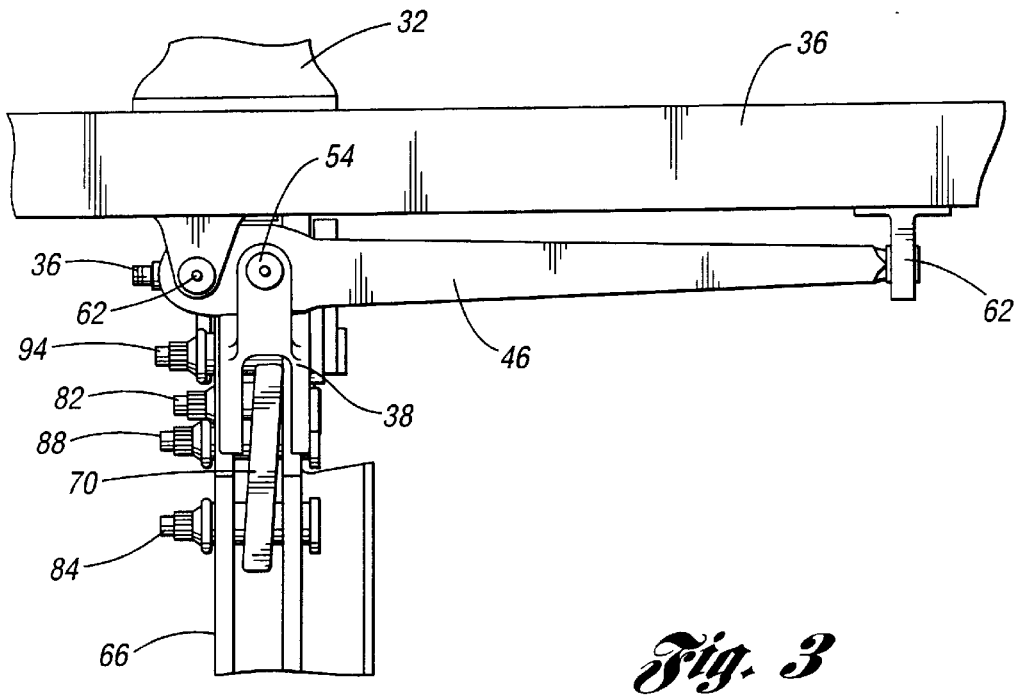
FIG. 3 shows a side view of the structure shown in FIG. 2.
Figure 4:
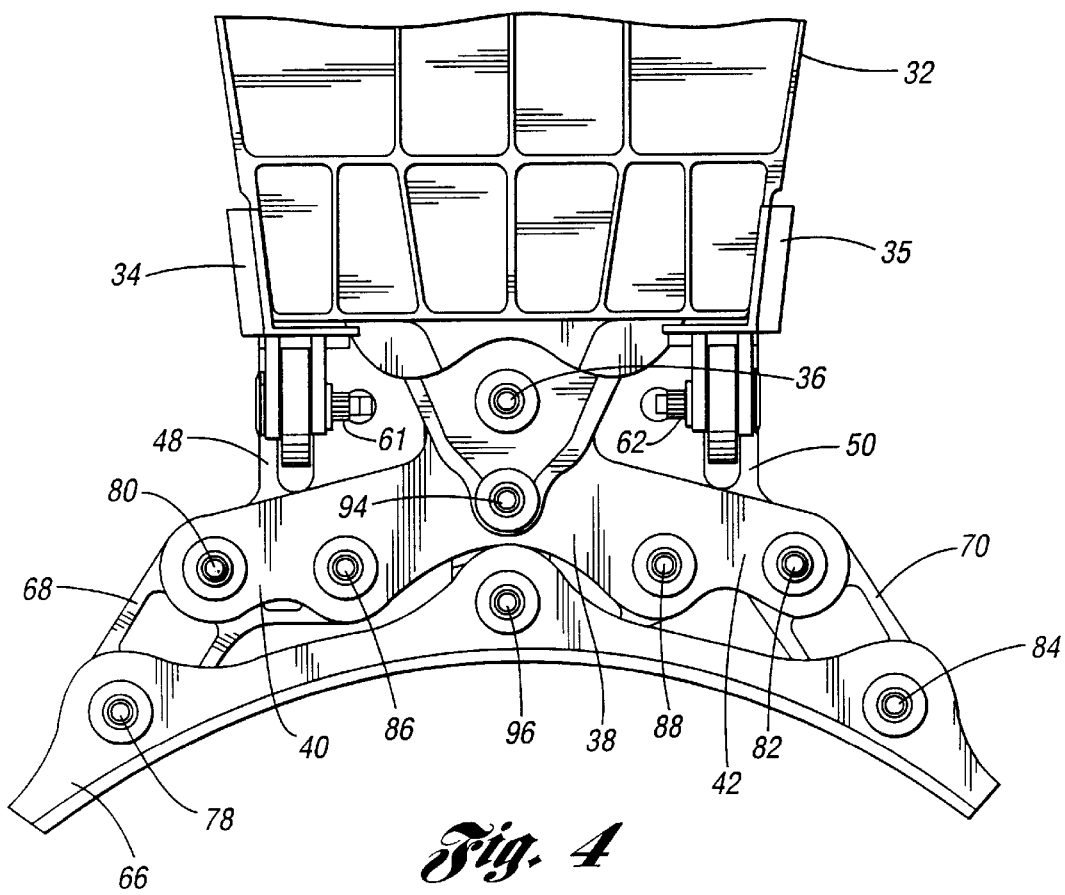
FIG. 4 shows a front view of the structure shown in FIG. 2.

The hanger-shaped fitting 38 is pivotally connected to the engine turbine case 66 by the first and second end links 68,70. The first and second end links 68,70 are connected, respectively, at opposing ends 72, 74, 76, 78 between the hanger fitting 38 and engine case 66 by the respective pins 78, 80, 82, 84. The end links 68,70 also include secondary catchers 86,88 loosely pivotally connected to the hanger-shaped fitting 38 as a stop gap measure. The catchers 86,88 only bear load if the pins 80,88 are not torqued down properly. A middle link 90 is also pivotally connected between a middle portion 92 of the hanger-shaped fitting 38 and the engine case 66 via the pins 94,96. The links 68, 70, 90 have spherical bearings at each attachment point, thereby allowing cocking of the links, as illustrated in FIG. 3.

An applied side load will cause the engine 14 to rotate about a line between the forward engine mount and the aft engine mount hanger center pivot 36. This rotation is limited by the flex of the two spring beams 44,46. The size and material of the spring beams 44,46 can be tailored to produce the desired reduction in overall lateral natural frequency of the underwing propulsion system.

Figure 5:
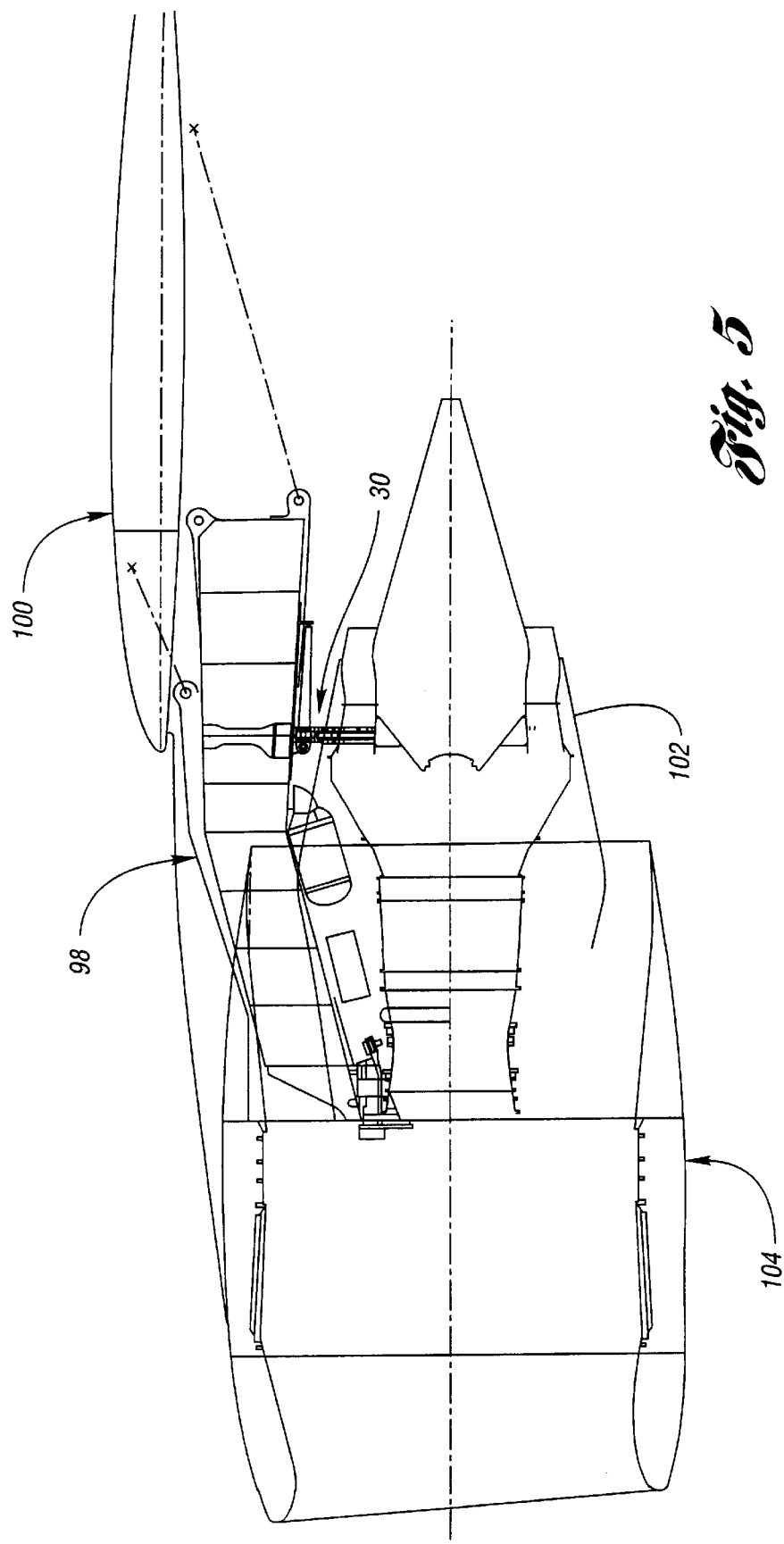
FIG. 5 shows a side view of an aft engine mount incorporated onto an aircraft in accordance with the present invention.
Figure 6:
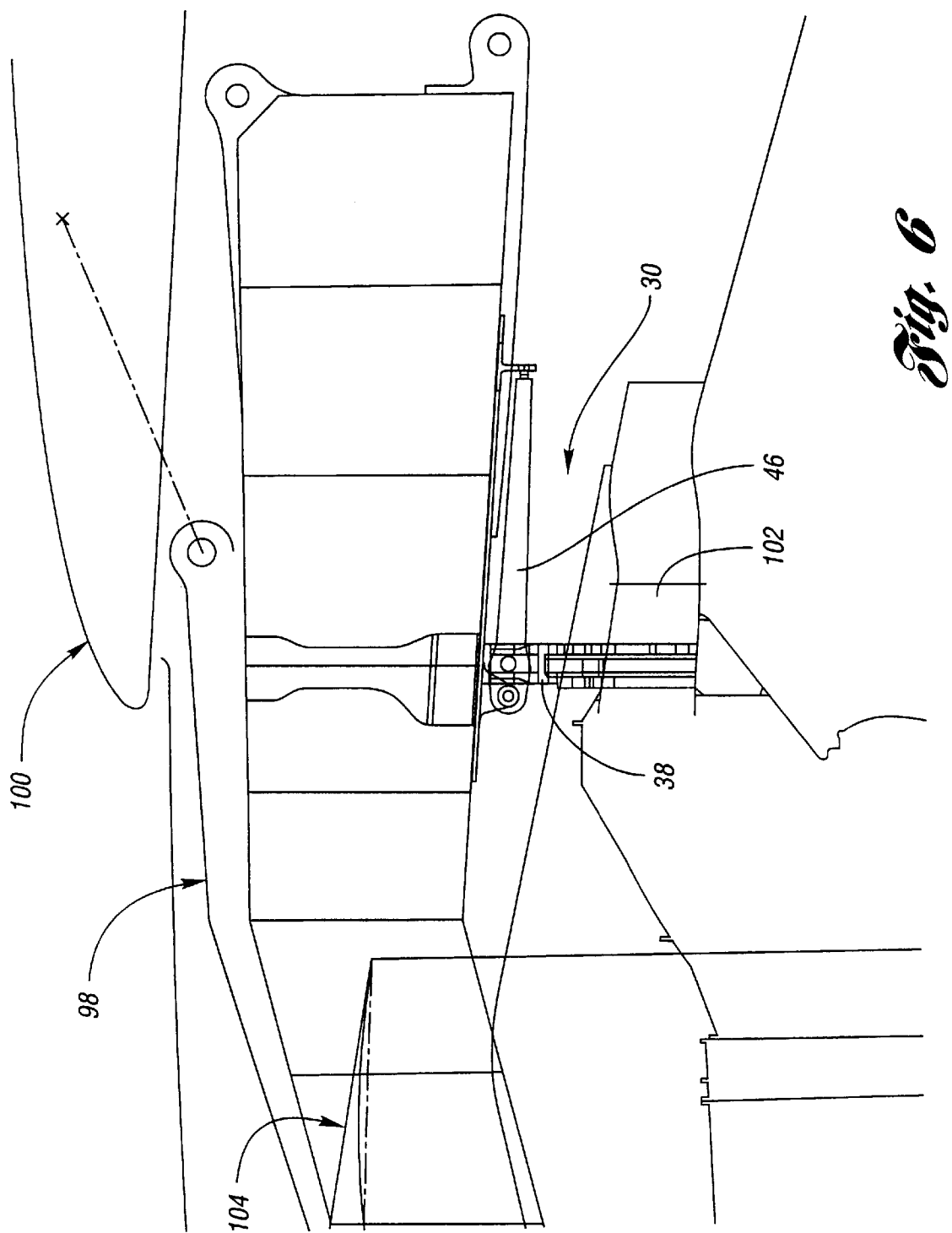
FIG. 6 shows an enlarged side view of the structure shown in FIG. 5.

FIGS. 5 and 6 show side views of the aft engine mount 30 of the present invention attaching the pylon structure 98 of a wing 100 to the core cowl 102 of an engine 104.

While an embodiment of the invention has been illustrated and described, it is not intended that this embodiment illustrates and describes all possible forms of the invention. It is intended that the following claims cover all modifications and alternative designs, and all equivalents, that fall within the spirit and scope of this invention.

What is claimed is:

1. An aircraft assembly comprising:
    a wing;
    a pylon structure attached to the wing;
    an aft engine mount attached to the pylon structure;
    an engine attached to the aft engine mount; and
    wherein the aft engine mount includes a pivotal attachment to the pylon structure and first and second spring beams operatively connected to the pylon structure at opposing sides of the pivotal attachment for damping pivotal movement of the engine with respect to the pylon structure to enable tuning of the natural frequency of the engine.

2. The aircraft assembly of claim 1, wherein the aft engine mount further comprises a hanger-shaped fitting pivotally connected to the pylon structure at the pivotal attachment, and the hanger-shaped fitting being connected at opposing ends thereof to the first and second spring beams.

3. The aircraft assembly of claim 2, further comprising first and second end links pivotally connected respectively between the opposing ends of the hanger-shaped fitting and the engine.

4. The aircraft assembly of claim 3, wherein the first and second end links each include a secondary catcher loosely pivotally connected to the hanger-shaped fitting.

5. The aircraft assembly of claim 3, further comprising a middle link pivotally connected between a middle portion of the hanger-shaped fitting and the engine.

6. The aircraft assembly of claim 2, wherein each of the first and second spring beams is connected at first and second ends thereof to the pylon structure, and connected to the hanger-shaped fitting between the first and second ends.

7. The aircraft assembly of claim 6, wherein each of the first and second spring beams is journalled to the pylon structure at the first end of the respective spring beam to allow fore and aft movement of the respective first end with respect to the pylon structure.

8. The aircraft assembly of claim 7, wherein the second end of each spring beam is pivotally attached to the pylon structure.

9. An aft engine mount for attaching an aft portion of an aircraft engine to a pylon structure, the aft engine mount comprising a pivotal attachment to the pylon structure and first and second spring beams operatively connected to the pylon structure at opposing sides of the pivotal attachment for damping pivotal movement of the engine with respect to the pylon structure.

10. The aft engine mount of claim 9, further comprising a hanger-shaped fitting pivotally connected to the pylon structure at the pivotal attachment, and the hanger-shaped fitting being connected at opposing ends thereof to the first and second spring beams.

11. The aft engine mount of claim 10, further comprising first and second end links pivotally connected respectively between the opposing ends of the hanger-shaped fitting and the engine.

12. The aft engine mount of claim 11, wherein the first and second end links each include a secondary catcher loosely pivotally connected to the hanger-shaped fitting.

13. The aft engine mount of claim 11, further comprising a middle link pivotally connected between a middle portion of the hanger fitting and the engine.

14. The aft engine mount of claim 10, wherein each of the first and second spring beams is connected at first and second ends thereof to the pylon structure, and connected to the hanger-shaped fitting between the first and second ends.

15. The aft engine mount of claim 14, wherein each of the first and second spring beams is journalled to the pylon structure at the first end of the respective spring beam to allow fore and aft movement of the respective first end with respect to the pylon structure.

16. The aft engine mount of claim 15, wherein the second end of each spring beam is pivotally attached to the pylon structure.

17. An aircraft assembly comprising:
 a wing;
 a pylon structure attached to the wing;
 an aft engine mount attached to the pylon structure;
 an engine attached to the aft engine mount; and
 wherein the aft engine mount includes first and second spring beams each having first and second ends and operatively connected to the engine between the first and second ends, and wherein lateral movement of the engine is limited by the flexibility of the first and second spring beams.

18. The aircraft assembly of claim 17, wherein the aft engine mount is pivotally attached to the pylon structure between the first and second spring beams.

19. The aircraft assembly of claim 18, wherein the aft engine mount further comprises a hanger-shaped fitting pivotally connected to the pylon structure at the pivotal attachment, and the hanger-shaped fitting being connected at opposing ends thereof to the first and second spring beams.

20. The aircraft assembly of claim 19, further comprising first and second end links pivotally connected respectively between the opposing ends of the hanger-shaped fitting and the engine.

* * * * *